UNITED STATES PATENT OFFICE.

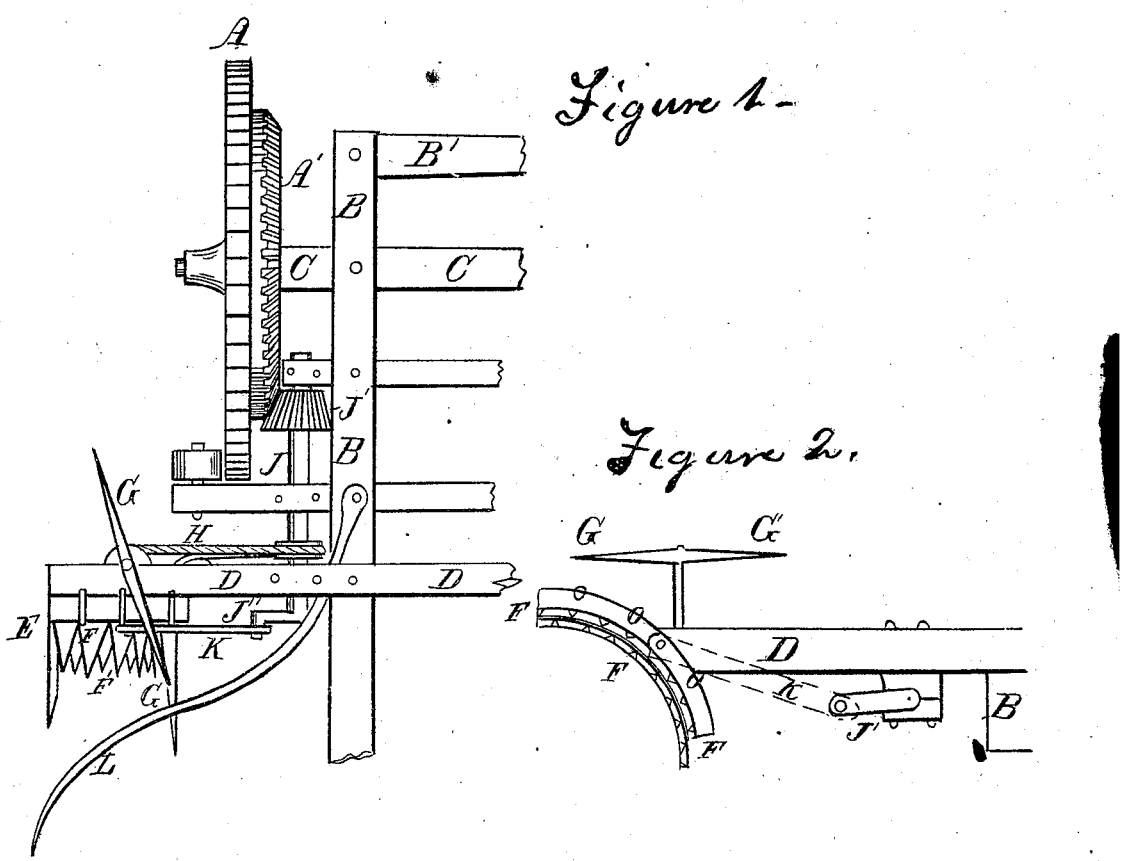

JOSEPH McANULTY, OF BENTLEY, ILLINOIS.

IMPROVEMENT IN HEDGE-TRIMMERS.

Specification forming part of Letters Patent No. 107,517, dated September 20, 1870.

*To all whom it may concern:*

Be it known that I, JOSEPH MCANULTY, of Bentley, Hancock county, Illinois, have invented a new and useful Improvement in Hedge-Trimmers, which I declare to be made and used substantially as shown and set forth herein and in the accompanying drawing, on which are marked letters of reference corresponding with like letters used herein—

Figure 1 being a top view or plan of the peculiar parts of my hedge-trimmer as mounted for use. Fig. 2 is a vertical cross-section of a portion of same.

The object of this invention is to make a trimmer for hedges which will be simple and practical, and be of moderate cost and ready use.

It is designed for use on the running parts of a common wagon by removing one back wheel and replacing with the wheel A, to act as a drive-wheel for the apparatus; or this may be made by an attachment to the ordinary wheel, the attachment being removable. On the ordinary wagon the usual bed parts are taken off, and a frame, B B', bearing the parts for trimming, is placed on instead, as shown in the drawing, the parts not shown being corresponding or usual parts, and C being the back axle, and the frame B extending forward onto the fore axle, and being fixed in place by suitable means.

The trimmer reaches out from one side from the cross part D, so as to trim the hedge by driving along it.

The trimming parts E are made of any suitable arrangement of shearing-sections, which may be after the manner of mower sickle-knives, with top and bottom sickles F F', arranged to work together, one, F, moving and the other stationary. The sickles F F', instead of being straight, are curved, as in Fig. 2, one sliding back and forth over the other in the curve, so as to leave the section of a circle in the form left on the hedge. Appropriate means may be used for raising or lowering or changing the angle of the cutters to suit the hedge.

Revolving arms G G' are used to keep the loose brush from accumulating on the sickle. This is turned by a band, H, from the pulley on driving-shaft I.

The wheel A bears a large bevel drive-wheel, A', on its side, which drives bevel-pinion I' on shaft I, which, at its front end, has a crank-arm, I'', which drives a pitman, K, which moves the sickle F for trimming.

For small hedges a finger, L, is used. This projects forward and reaches over the hedge and down on the far side, bringing up straggling limbs and parts, so that they will be cut for small hedges.

I am aware hedge-trimmers have been made, and disclaim the general ideas; but

What I claim is—

The arrangement, on the frame B B' D, of the guide-finger L, the curved stationary and reciprocating cutters F and F', reel G, and their driving-gear, all being constructed and operating as described.

JOSEPH McANULTY.

Witnesses:
 S. J. SHOUP,
 J. M. SLUSHER.